United States Patent [19]

Bernard et al.

[11] Patent Number: 4,706,375

[45] Date of Patent: Nov. 17, 1987

[54] METHOD OF FORMING A SOLID TANTALUM CAPACITOR

[75] Inventors: Walter J. Bernard; E. James Fresia, both of Williamstown, Mass.

[73] Assignee: Sprague Electric Company, North Adams, Mass.

[21] Appl. No.: 896,686

[22] Filed: Aug. 15, 1986

[51] Int. Cl.⁴ .......................... H01G 9/06; H01G 9/10; H01G 13/04
[52] U.S. Cl. .................................. 29/570.1; 29/25.41
[58] Field of Search ................................ 29/25.41, 570

[56] References Cited

U.S. PATENT DOCUMENTS 3,850,764  11/1974  Herczog et al. ............... 29/25.41 X Primary Examiner—Howard N. Goldberg
Assistant Examiner—Taylor J. Ross

[57] ABSTRACT

The dielectric stability of a hermetically-sealed solid-electrolyte tantalum capacitor during high temperature storage is improved by the introduction of a small controlled amount of water into the capacitor container before the final sealing step in the manufacture of the capacitor.

5 Claims, No Drawings

METHOD OF FORMING A SOLID TANTALUM CAPACITOR

BACKGROUND OF THE INVENTION

This invention involves a process for improving the dielectric properties of hermetically-sealed solid-electrolyte tantalum capacitors, and more particularly to improving the storage life of such capacitors which are likely to be stored at elevated temperatures without voltage.

Hermetically sealed solid-electrolyte tantalum capacitors undergo some degree of dielectric degradation when stored at elevated temperatures in the absence of an applied potential. This degradation is manifested after the storage period by a high leakage current upon the re-application of voltage. Typically, a capacitor with a leakage current of less than 0.1 microampere before storage may show leakage current of 1 to 10 microamperes after several days storage at 125° C.

Although high temperature storage for extended periods leads to dielectric damage, this damage can be easily repaired when voltage is subsequently applied, provided that there is sufficient moisture within the capacitor structure to accomplish the necessary electrochemical change.

The role of water as an essential substance in the growth of anodic oxides has been described in the scientific literature (Bernard and Florio, J. Electrocomponents Tech., Vol. II, pp, 137-145, 1984). More specifically, the critical nature of water in the growth of anodic oxide in the presence of a solid electrolyte in tantalum capacitors has long been generally known (Smyth, J. Electrochemical Soc., Vol. 113, p. 19, 1966).

Nonhermetically-sealed capacitors do not show a persistently high leakage current after high temperature storage, because moisture from the environment can be transported either through the casing material or into the casing along the lead wires at a rate sufficient to create a concentration of water which is high enough to carry out the function of dielectric repair rapidly and efficiently upon the re-application of potential.

Hermetically-sealed capacitors, on the other hand, do not allow any ingress of moisture. Furthermore, hermetically-sealed capacitors may be depleted of water at the beginning of their storage life because of the processes that are used in sealing. It is conventional in the art to secure a capacitor body in its impervious can with solder, requiring a temperature of about 200° C., which very effectively expels any residual moisture. Thus, upon sealing the eyelet, the anode is in a dry atmosphere that can no longer provide the water that is required to carry out oxide regrowth if such regrowth should prove necessary.

SUMMARY OF THE INVENTION

It is a feature of this invention to provide a process by which the water content of a hermetically sealed solid-electrolyte tantalum capacitor is maintained at a level sufficient to enable the capacitor to carry out the process of electrochemical repair after being subjected to storage conditions that result in dielectric damage.

The process of this invention involves the controlled introduction of water in some appropriate form to the capacitor structure before its final sealing as a hermetic unit. The most convenient stage for this step of introducing water is after the capacitor body has been secured by soldering to the can interior and cooled sufficiently so as to accept and retain the water required, following which the eyelet sealing may be accomplished.

Water may be introduced in a number of ways. The simplest procedure, following the securing of the pellet to the can, is to expose the open capacitor to moisture in a controlled humidity chamber, the conditions therein being determined experimentally as those leading to optimum capacitor properties.

Alternatively, the capacitor is carried through a mist, or aerosol, of water, under which it would be cooled and thereby draw in droplets of liquid water through the open eyelet: the transit time in such an environment would again be determined by the final properties desired of the capacitor.

When it is convenient in a manufacturing operation, another procedure is to permit the capacitor to stand in the ordinary atmosphere for sufficient time, depending on the humidity, to allow water vapor to reach the desired concentration in the can.

Still another, less time-consuming, modification is to place the capacitor in a vacuum chamber, exhaust the chamber to a moderately low pressure (0.1 torr or less), and then introduce a small amount of liquid water at ordinary temperatures in the chamber; under such conditions the capacitor immediately becomes filled with water vapor, since the processing time is not controlled by a slow diffusion step.

Another preferred method includes the introduction of a suitable hydrate of a solid substance into the capacitor can before sealing the cover assembly. Another less desirable method is the precise metering of minute amounts of water into each capacitor by means of a microsyringe through the unsealed eyelet.

In the use of any of the foregoing methods it is essential that only the amount of water actually needed for proper operation of the capacitor should be introduced, Water in excess of that required for repair may lead to undesirable electrical properties, such as increased dissipation factor. The degree of control and care may be appreciated by considering the actual extent of dielectric damage that occurs under storage, and how little electrochemical change is required to correct that damage.

In a typical case, a capacitor rated at 35 V had an post-storage leakage current of 10 microamps. When the capacitor body was exposed to moist air, the leakage current decayed to less than 1 microamp in three minutes. The measured charge passed was only 0.36 millicoulomb, which—using Faraday's Law—shows that only 0.03 microgram of water was required to bring about the oxide growth which occurred. It would not be expected, however, that completely efficient use of water in the manner implied in the calculation could occur, but rather that a considerable excess would be needed.

Nevertheless, the exercise demonstrates that only extremely low concentrations of water are required. Therefore, the process must be carried out to ensure that moisture, in the form of vapor, liquid, or a component of a solid, is introduced in a highly reproducible and controlled manner.

DESCRIPTION OF THE PREFERRED EMBODIMENTS

Solid-electrolyte tantalum capacitors prior to being hermetically sealed are placed in a chamber with a controlled humidity and temperature, allowing water vapor to diffuse into the free space of the cans through the open eyelets in the seals. The capacitors are then sealed by soldering the eyelets. The rate of diffusion, and thus the time of exposure in the chamber, is dependent on the temperature and relative humidity. Satisfactory results may be obtained by using humidities ranging from 40% to 100% at temperatures from 25° to 85° C. Depending on the conditions chosen, the time of exposure may range from five minutes to many hours. Excellent results were obtained, for example, by using a 15 minute exposure at 65° C. and 100% relative humidity.

Under some circumstances it may be convenient instead to allow the open capacitors to stand for a period of time in the ambient air of the manufacturing plant, and thereby absorb the requisite moisture from the atmosphere. This is not a practicable procedure when the humidity is very low, i.e. below 40%; but, at higher relative humidities the capacitors can attain the desired water concentration over a period of a few days.

However, it is preferred to use a method that is inherently more reproducible and controllable, for example one involving a vacuum procedure. In this method, the unsealed capacitors are transferred to a vacuum chamber and the pressure in the chamber is reduced to 0.10 torr or less. This reduced pressure is maintained for a few minutes to ensure that the entire porous structure of the capacitor body within the can has also been evacuated to the low pressure of the system. A small amount of liquid water is then allowed to enter the vacuum chamber through an appropriate valving arrangement. The design of such an apparatus is not critical except to safeguard the capacitors from contact with liquid water which could then be inadvertently drawn into a can through an open eyelet, and thereby deliver an undesirable excess. Under the proper conditions the capacitors are instantly filled with water vapor at a pressure of about 24 mm, when the water temperature is 25° C. The chamber can then be brought back to atmospheric pressure, and the capacitor eyelets sealed.

EXAMPLE 1

Capacitors rated at 22 uF-50 V were manufactured to test the effectiveness of introducing moisture via a high humidity atmosphere into the can prior to sealing the eyelet.

The control capacitors were manufactured in the conventional manner known to the art for hermetically-sealed capacitors, while the experimental units were prepared by the same processing only up to the eyelet seal stage, i.e. capacitor bodies were anchored to the cans and the covers were soldered in place without sealing the eyelets in the covers. The open eyelet units were placed in a glass desiccator containing water in an oven at 65° C., and exposed to this high humidity for 15 minutes.

After exposure to humidity the capacitors were sealed, taking care to confine the heat of sealing to the eyelet area only.

Both groups of capacitors were subjected to standard voltage aging and then put on storage at 125° C. for 140 hours without voltage applied. At the end of the storage period the leakage currents were read again after three minutes charging at rated voltage. The following results represent the median values of ten capacitors in each group:

|  | Leakage Current (uAmps) | |
| --- | --- | --- |
|  | Before Storage | After Storage |
| Controls | 0.027 | 2.1 |
| Experimental | 0.020 | 0.051 |

It is apparent that units sealed with water present exhibited a relatively insignificant increase in leakage current, while the controls increased by a factor of about 80.

EXAMPLE 2

Capacitors rated at 47 uF-35 V were manufactured for the purpose of testing both the effectiveness of (a) standing with open eyelets for a long period at room temperature and (b) the low pressure introduction of water vapor.

The control capacitors were prepared and sealed in the standard way. Experimental Group A units were left unsealed and exposed to the laboratory atmosphere with a humidity of greater than 60% for eight days. Experimental Group B units were also unsealed and placed in a vacuum chamber and held at 0.1 torr for several minutes. Water was allowed to enter the chamber, but did not come in contact with the capacitors.

Both Group A and Group B of capacitors were sealed, following the procedure of Example 1 above.

All capacitors were given a standard voltage aging and then stored in an oven at 125° C. for 258 hours. Leakage currents were then measured using a five-minute charging period of 35 volts. The results below are the median values of twelve units in each of the three groups:

|  | Leakage Current (uAmps) | |
| --- | --- | --- |
|  | Before Storage | After Storage |
| Control | 0.43 | 9.2 |
| Experimental A | 0.18 | 0.48 |
| Experimental B | 0.064 | 0.13 |

The results show that both experimental groups A and B showed a small change in leakage current, while the control group showed a large change. This demonstrates the efficiency of the procedure of this invention in protecting the capacitor.

EXAMPLE 3

Capacitors rated at 22 uF-50 V were manufactured for the purpose of testing the effectiveness of the presence of solid hydrates of known water content which release water at 100°-125° C. The compounds chosen were sodium dihydrogen phosphate monohydrate ($NaH_2PO_4.H_2O$) with a water content of 13.0% and potassium oxalate monohydrate ($K_2C_2O_4.H_2O$) with a water content of 9.8%; both are reported in the literature to decompose at about 100° C.

The control capacitors were prepared and sealed as in the previous examples, but experimental units were retained with unsealed covers until the solid powders of hydrates were dispensed into the cans. Group A had 10 mg of $NaH_2PO_4.H_2O$ added to each capacitor, equivalent to 1.3 mg of water, and Group B had 20 mg of $K_2C_2O_4.H_2O$ added to each can, equivalent to the addition of 2.0 mg of water. All Group A and Group B units were then completely sealed.

The three groups of capacitors were given a standard voltage aging, and then stored without voltage in an oven at 125° C. for 192 hours. Then leakage currents were measured after charging the three groups at 50 V for five minutes. The results in the following table represent the median values of twelve units in each group:

|  | Leakage Current (uAmps) | |
| --- | --- | --- |
|  | Before Storage | After Storage |
| Control | 0.070 | 5.2 |
| Experimental A | 0.016 | 0.022 |
| Experimental B | 0.010 | 0.041 |

The two experimental groups, containing the decomposable hydrates, gave shelf life protection to the capacitors, while the control units prepared in the standard way showed a deterioration of leakage currents during shelf test. However, the 1.3 mg and 2 mg of water added to Group A and Group B units increased the dissipation factor (D.F.) of the units during storage.

EXAMPLE 4

A second set of experiments were run to see if lesser amounts of hydrate could accomplish the desired effect on leakage current without increasing the D.F. In order to add smaller quantities of water with reasonable accuracy, the hydrated phosphate was diluted with pure $Ta_2O_5$. The advantages of $Ta_2O_5$ as a diluent are twofold: it does not hydrate readily, and thus leaves the water free to carry out its function; and, it avoids the complication of adding still another foreign substance to the capacitor system.

The shelf test results of five groups of 22 uF–50 V capacitors were as follows:

| $H_2O$ Added (Calc.) | Before Test | | | After 140 Hrs. @ 125° C. | | |
| --- | --- | --- | --- | --- | --- | --- |
|  | Cap. | % D.F. | $I_L$ (uA) | Cap. | % D.F. | $I_L$ (uA) |
| A Control (0) | 20.28 | 0.88 | 0.050 | 20.79 | 0.78 | 2.8 |
| B 0.18 mg. | 21.03 | 1.10 | 0.044 | 20.96 | 0.84 | 0.74 |
| C 0.36 mg. | 21.09 | 1.22 | 0.019 | 20.95 | 0.75 | 0.25 |
| D 0.39 mg. | 21.21 | 1.65 | 0.013 | 20.87 | 0.74 | 0.056 |
| E 0.78 mg. | 21.49 | 2.08 | 0.020 | 20.90 | 1.00 | 0.026 |

An effect on leakage current and D.F. was observed with even the smallest water addition of 0.18 mg. Group E, with 0.78 mg. $H_2O$ gave excellent leakage current results but showed a high initial D.F. It is concluded that about 0.5 mg. of $H_2O$ would be adequate and would not affect the D.F. excessively.

We claim:

1. A process for improving the dielectric properties of a solid-electrolyte tantalum capacitor, said process comprising providing a capacitor section soldered into an impervious can having an opening in an end thereof, soldering into said opening a seal having an open eyelet, introducing a controlled amount of water through said eyelet into said can, and thereafter hermetically sealing said eyelet.

2. The process of claim 1 wherein said introducing step is by exposing said open can to moisture in a controlled humidity chamber.

3. The process of claim 1 wherein said introducing step is by carrying said open can through a mist of water.

4. The process of claim 1 wherein said introducing step is by subjecting said open can to a vacuum of 0.1 torr or less and then introducing water into the vacuum chamber to fill said chamber with water vapor.

5. The process of claim 1 wherein said introducing step is by introducing into said open can a hydrate of a solid substance which releases water upon heating.

* * * * *